(12) United States Patent
Dippold et al.

(10) Patent No.: US 7,756,765 B2
(45) Date of Patent: Jul. 13, 2010

(54) SYSTEM AND METHOD FOR ORDER PURCHASING AND FULFILLMENT

(75) Inventors: Robert E. Dippold, Overland Park, KS (US); Brenda Wilson, Shawnee Mission, KS (US)

(73) Assignee: Bayer HealthCare LLC, Shawnee Mission, KS (US)

( * ) Notice: Subject to any disclaimer, the term of this patent is extended or adjusted under 35 U.S.C. 154(b) by 1354 days.

(21) Appl. No.: 11/000,253

(22) Filed: Nov. 30, 2004
(Under 37 CFR 1.47)

(65) Prior Publication Data
US 2006/0116940 A1 Jun. 1, 2006

(51) Int. Cl.
*G06Q 40/00* (2006.01)
(52) U.S. Cl. .......................................... 705/35; 705/44
(58) Field of Classification Search .................... 705/26, 705/40, 35
See application file for complete search history.

(56) References Cited

U.S. PATENT DOCUMENTS 5,710,887 A * 1/1998 Chelliah et al. ............... 705/26

2003/0050857 A1 3/2003 Shaftel

OTHER PUBLICATIONS

Food chemical News (PMO Requirements Update, Revisions Issued by FDA, v 34, n42, p. N/A, Dec. 1992).*
International Preliminary Report on Patentability, dated May 8, 2007, PCT/US2005/43228, System and Method for Order Purchasing and Fulfillment, 4 pages.
International Search Report and Written Opinion, dated Oct. 18, 2006, PCT/US2005/43228, System and Method for Order Purchasing and Fulfillment, 8 pages.

* cited by examiner

*Primary Examiner*—Ojo O Oyebisi
(74) *Attorney, Agent, or Firm*—Woodcock Washburn LLP

(57) ABSTRACT

A system and method for managing product orders coordinates corresponding retail and wholesale orders, to provide efficient settlement and distribution of funds to all parties involved. The systems and methods disclosed do not require retailers to carry an inventory of products, and the processing of the retail order and its corresponding wholesale order, and shipment of the product, are transparent to the consumer or retail buyer. As a result of this transparency, the consumer sees only the delivered product and a corresponding charge on a credit card statement.

5 Claims, 12 Drawing Sheets

CONSUMER CREDIT CARD IS AUTHORIZED

SYSTEM AND METHOD FOR ORDER PURCHASING AND FULFILLMENT

FIELD OF THE INVENTION

The present invention relates in general to a system and a method for purchasing one or more products and fulfilling purchase orders for the product or products. The invention pertains, more particularly, to an electronic system and method for receiving and managing one or more orders for one or more products, where a consumer generates an order that generates a response in both the retail and wholesale channels, and results in the consumer receiving an ordered product and the settlement of all opened accounts between the retailer and the wholesaler, in response to the consumer's purchase order.

BACKGROUND OF THE INVENTION

In the pet nutrition industry, veterinarians typically recommend, endorse and sell specialty pet nutrition products, either directly or through suppliers. This results in a highly controlled supply and distribution chain, whose maintenance ensures that the pet owner receive the specific and authentic product required by their pet.

Veterinarians maintain control over the conventional supply chain by stocking the requisite products, and overseeing their distribution and sale. While this seems practical, it requires the veterinarians to maintain large storage spaces capable for storing perishable products. They must also spend significant time running a store type operation. Many veterinarians lack such space and the desire to run a store type operation; however, with high profit margins from retail sales of such specialty products, most veterinarians want to sell and distribute these products as retailers. Also, being a retailer of specialty products generates good will for the veterinarian's practice.

As the consumer base continues to grow and move farther away from veterinarians, it is not always feasible for these consumers to travel to obtain their specialty nutrition products for their pets. Moreover, a pet owner, who travels to their veterinarian, depends on that particular veterinarian's inventory being adequately stocked with the desired specialty products in the desired amounts.

Other industries maintain control over their supply chains, and in particular, allow only authorized retailers to sell the product. For example, U.S. Patent Publication US 2003/0050857 A1 discloses an electronic commerce marketing system, where a consumer places an electronic order with a supplier over the supplier's web site. The supplier then directs the order to a field service representative or salesperson, who sells the ordered product to the consumer for the retail price. The field service representative purchases the product at any time from the supplier, and carries the product in his inventory, regardless of whether the product has been ordered by a consumer.

Additionally, professional activities, such as retail sales by certain retailers, are legally regulated. This is especially true for health professionals, and in particular, licensed animal health professionals. For example, California prohibits veterinarians from receiving commissions from any referrals they make, including referrals of products. As a result, veterinarians must be extremely careful when offering products for sale to consumers.

SUMMARY OF THE INVENTION

The system and method of the invention improves on conventional ordering and purchasing processes, as it does not require a retailer, such as a veterinarian, to maintain an inventory of product. The sales do not require physical handling of product, nor do they involve logistics for moving product, on the part of the retailer.

In particular, the present invention is applied to transactions that begin when a pet owner, either independently or through the recommendation from a veterinarian, orders a product, and culminates in the pet owner receiving the ordered product. The product is ordered through an ordering system that matches the pet owner and the veterinarian. In particular, the ordering system includes veterinarian retailer web sites, from which the product is ordered from the supplier. All orders placed on these veterinarian retailer web sites are subject to approval of the veterinarian retailer.

The system and method improve on conventional ordering and purchasing processes, for example, for specialty pet nutrition products, whose supply and distribution chain is highly controlled, as participants in the supply and distribution chain are approved and may be licensed. The highly controlled nature of the supply and distribution chain includes retail sales through participating veterinarian retailers, who are authorized by the supplier, and active participation of these selected veterinarian retailers in making the sales, coupled with home delivery of the product from a supplier of authentic product. In this manner, only the proper and authentic product reaches the consumer.

The present invention also includes methods for selling products through professionals, such as health professionals, whose sales activity may be legally regulated. The present invention provides systems and methods for sales activity of specialized products by licensed health professionals, where the professional sells products without maintaining an inventory or receiving a commission for the sales.

The present invention provides an electronic system and method for purchasing and fulfilling a product order between a consumer, who typically purchases the product as a retail buyer, a retailer, who sells the product, and a supplier, the wholesaler of the product. As a result of the invention, a consumer needing a specialty product sold through a highly controlled distribution chain, can electronically purchase the specialized product, and have it delivered to a desired location, in a single purchasing operation. The consumer must no longer travel to a specialized retailer, for example, a veterinarian. This eliminates the risk that the desired amount of product is not available in veterinarian's on-site inventory.

The present invention provides a method where retail orders and their corresponding wholesale orders are coordinated, to provide efficient settlement and distribution of funds to all parties involved. The consumer places the retail order for the product with a veterinarian retailer, the processing of the retail order and corresponding wholesale order, and shipment of the product, are transparent to the consumer. As a result of this transparency, the consumer sees only the delivered product and a corresponding charge on a credit card statement.

The invention is directed to a method for managing an order for a product. The method includes, receiving electronic input corresponding to at least one order for the product, electronically placing a first order with a financial agent based on the received at least one order, and, electronically placing a second order with a supplier based on the received at least one order. Funds corresponding to the at least one order are electronically received, and at least a portion of these received funds are electronically transferred to the supplier.

Another embodiment of the invention is directed to an apparatus for managing orders for a product. The apparatus is, for example, controlled by a supplier of a product, who will receive the wholesale price for the product upon its sale by a retailer. The apparatus includes a first component for supporting a web site of at least one retailer, for example, a supplier-authorized veterinarian, over which at least one order for the product can be placed, a second component for receiving the at least one order for the product from the web site, and, a third component, linked with the second component. The third component functions to place a first order corresponding to the at least one order for the product to a financial agent, and to place a second order corresponding to the at least one order for the product to a supplier. There is also a fourth component for causing settlement of funds between a component that receives funds from the first order and a component that receives funds for the supplier.

Another embodiment of the invention is directed to a method for managing an order for a product. The method includes electronically receiving at least one order for the product from a buyer, for example, a retail buyer. A first order is placed with a financial agent based on the received at least one order; and a second order is placed with a supplier based on the received at least one order. The method also includes receiving funds corresponding to the at least one order, and transferring at least a portion of the received funds for the at least one order to the supplier.

Another embodiment of the invention is directed to a method for managing an order for a regulated product (whose sales are controlled, typically by statute or the like), where the product to be purchased by a buyer is determined based on a consultation with an entity authorized to order the regulated products from a supplier (e.g., an approved veterinarian retailer). An electronic order for the determined product is created by sending a first segment of the order, or first data associated with the electronic order, to a financial agent, and sending a second segment of the order, or second data associated with the electronic order, to the supplier. Funds are received from the financial agent that correspond to the first segment of the electronic order. The product associated with the second segment of the electronic order is shipped to the buyer, and, at least a portion of the received funds are transferred to the supplier, that correspond to the amount of the product sold, typically at the wholesale price, in the electronic order.

BRIEF DESCRIPTION OF THE DRAWINGS

Attention is now directed to the attached drawings, where like numerals or characters indicate corresponding or like elements. In the drawings.

DETAILED DESCRIPTION

1. System

The present invention is directed to systems and methods or processes for order purchasing and fulfillment at the consumer (buyer) and supplier levels, and corresponding retail and wholesale levels, respectively. The process is typically an electronic process over networks, such as the Internet, allowing multiple, geographically dispersed consumers, to purchase products from a tightly controlled distribution chain.

The ordering phase of the process is controlled. In particular, the consumer's order of the product is through a retailer, such as a licensed veterinarian retailer, or based upon the recommendation of the veterinarian retailer. The veterinarian retailer is authorized to sell the product by the supplier, who is the wholesaler of the product. Orders are placed through a web site of the veterinarian retailer, and are subject to approval of the veterinarian retailer. The veterinarian retailer and the supplier are electronically linked, over a network, such as the Internet, to expedite ordering and ultimate delivery of the ordered product to the consumer.

The process begins as a consumer, for example, a retail buyer or buyer (or purchaser), places a retail order for product with a veterinarian retailer. The veterinarian retailer has been authorized to sell the product by the supplier, who is typically the wholesaler of the product. The consumer places a retail order on a retailer's web site, either directly or through an agent. The consumer's retail order is translated into an electronic order, for processing over a network, such as the Internet. Placement of the electronic order sends a retail order for processing along a first channel, and a wholesale order for processing along a second channel. The retail and wholesale orders are placed contemporaneous in time, and are transparent to the consumer, who ordered the product.

Upon authorization of the consumer's credit card, the process is initiated to deliver the ordered product to the consumer. Contemporaneous with authorization, the consumer's credit card is settled and the retailer receives the retail price for the order. The wholesale price is paid to the supplier, who ships the ordered product to the consumer, and the retailer retains the difference between the retail and wholesale price (minus service charges) in a final settlement between the retailer's financial institution and the supplier.

During this process, title of the product transfers to the veterinarian retailer from the supplier, once the retail order has been approved and it has been received by the supplier, but before it is shipped to the consumer. However, the veterinarian does not maintain a physical inventory of the product at any time during the process.

Figure 1:
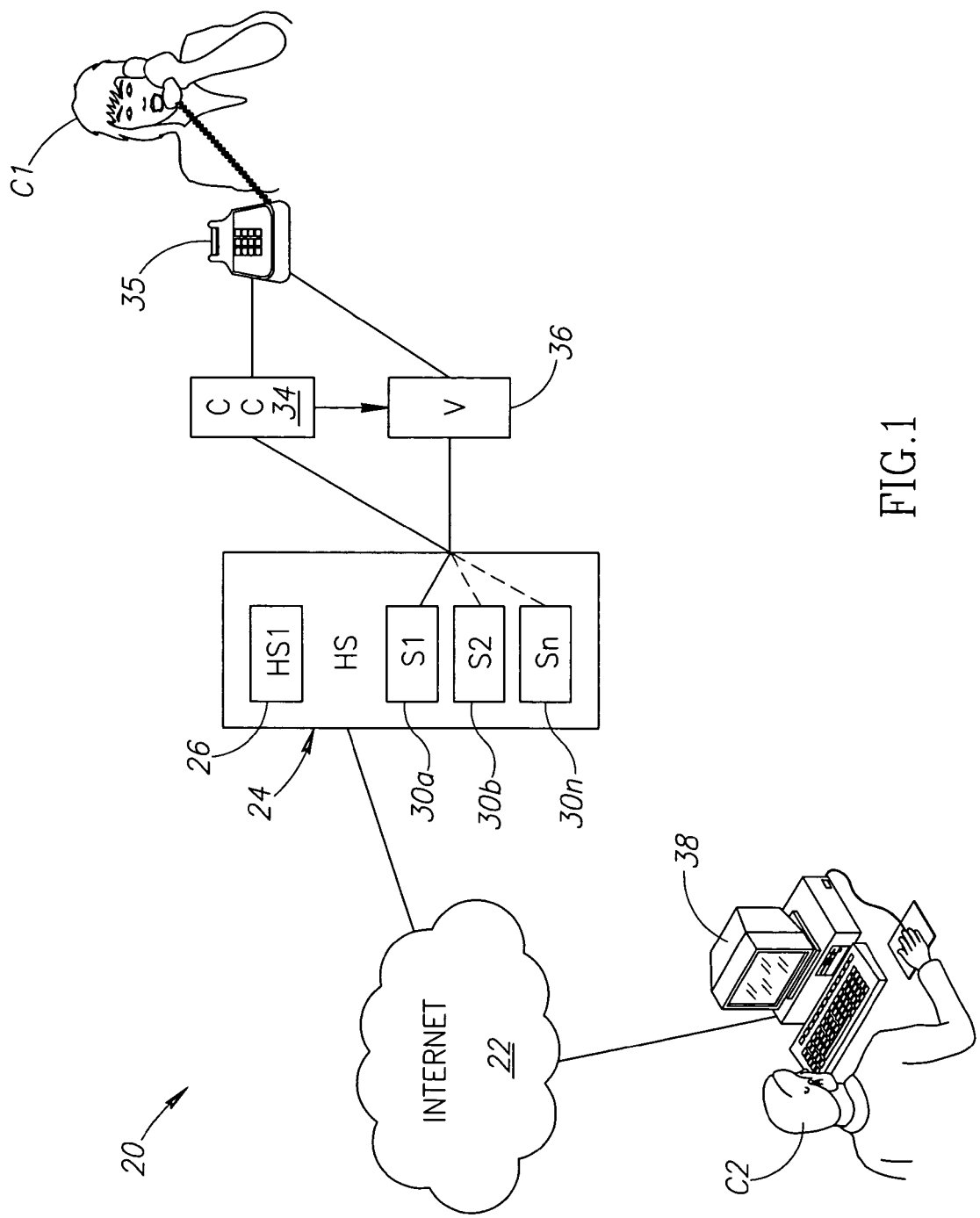
FIG. 1 is a diagram of an exemplary system showing the ordering process in accordance with an embodiment of the invention.

FIG. 1 shows the order process on an exemplary system 20. The system 20 includes a network, for example, the Internet 22, and a home server (HS) 24 associated with the supplier or wholesaler. The home server (HS) 24 supports its own web site (HS1) 26 and may support retailer web sites (S1-Sn) 30a-30n, either internally as shown, or externally, over the network, through which the supplier or wholesaler's product is sold. The retailers are, for example, veterinarians, that the supplier has authorized to sell the product over the individual veterinarians' web sites (S1-Sn) 30a-30n, that the supplier supports (for example, at the supplier's home server (HS) 24).

Product ordering occurs through two exemplary consumers, who are, for example, retail buyers or buyers, indicated as C1 and C2. Consumer C1 places an order, for example, a retail order, in a traditional manner, such as telephone, facsimile (fax), walkup, postal mail, or electronic mail (e-mail).

Consumer C2 places an order, for example, a retail order, electronically, over a network, such as the Internet.

A consumer, for example, the consumer indicated as C1, may contact the supplier directly, typically at a supplier's call center (CC) 34, by telephone 35. Since the product is only sold at the retail level through veterinarian retailers, the consumer's (C1) attempted order, will be referred to a web site (S1-Sn) 30a-30n of a veterinarian retailer who handles this product. Alternately, the agent at the call center (CC) 34 enters the consumer's (C1) order, for example, a retail order, on the veterinarian's web site, for example, site S1 30a, for the veterinarian of the particular consumer. The call center (CC) 34 is linked to the home server (HS) 24 and accordingly, to the veterinarian web sites (S1-Sn) 30a-30n. The veterinarian web sites (S1-Sn) 30a-30n, all include electronic commerce (e-commerce) modules to permit order placement and ordering, for example, at the home server (HS) 24.

Alternately, from the call center CC 34, the consumer C1 may be directed to the veterinarian (V) 36, either by telephonic transfer or a referral. The ordering process would continue as detailed immediately below.

The consumer C1 may also contact their regular veterinarian, for example, a veterinarian (V) 36. The veterinarian (V) 36 may take the consumer's order by telephone, fax, walk-up, postal mail, or electronic mail or the like, and transfer it to their web site (the veterinarian (V) 36 is linked to their web site), here, for example, site S1 30a, for this particular veterinarian retailer.

Alternately, the orders for product may be made electronically, as shown by a consumer, indicated as C2, at their computer 38. In a first instance, the consumer C2 may desire to purchase product from the supplier's web site (HS1) 26. The supplier's web site (HS1) 26, prompts the consumer C2 to select their veterinarian, by numerous searching parameters, such as name, address, city, zip code, telephone numbers. Once the veterinarian is located, the consumer C2 is directed to the veterinarian's web site, here, for example, the web site S1 30a. If the consumer C2 is a new customer, then their product selection is typically subject to a participating veterinarian's approval (typically through a consultation with the veterinarian to determine the specific product to be ordered).

The consumer C2 may also place their electronic order with the veterinarian's web site (provided they are an approved customer of the particular veterinarian based on a consultation with the veterinarian to select the specific product for their pet) by accessing this site, for example, site S1 30a, directly. This access typically includes directing their web browser in their computer 38 to the address of the veterinarian's web site.

The order (for example, a retail order) that has been placed, ultimately at the individual veterinarian's web site, typically includes, the consumer's name, address, telephone number, credit card number, billing address, shipping address and veterinarian name. The order now resides at the individual veterinarian's web site, for example, the site (S1) 30a, for processing in accordance with process (method) of FIGS. 3A-3D.

Figure 2:
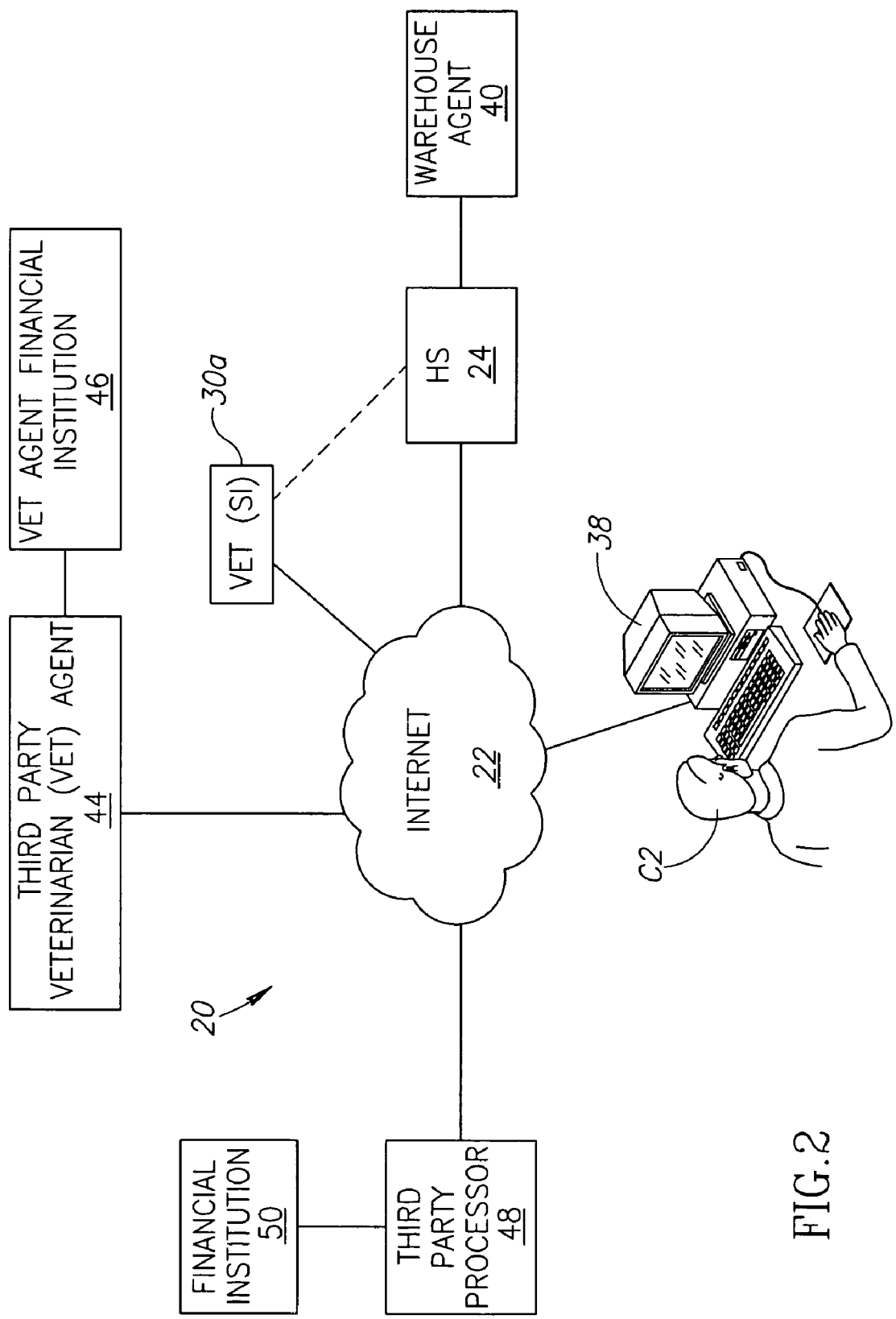
FIG. 2 is a diagram of the exemplary system of FIG. 1, showing the components associated with an embodiment of the invention after the order has been placed.
Figure 3A:
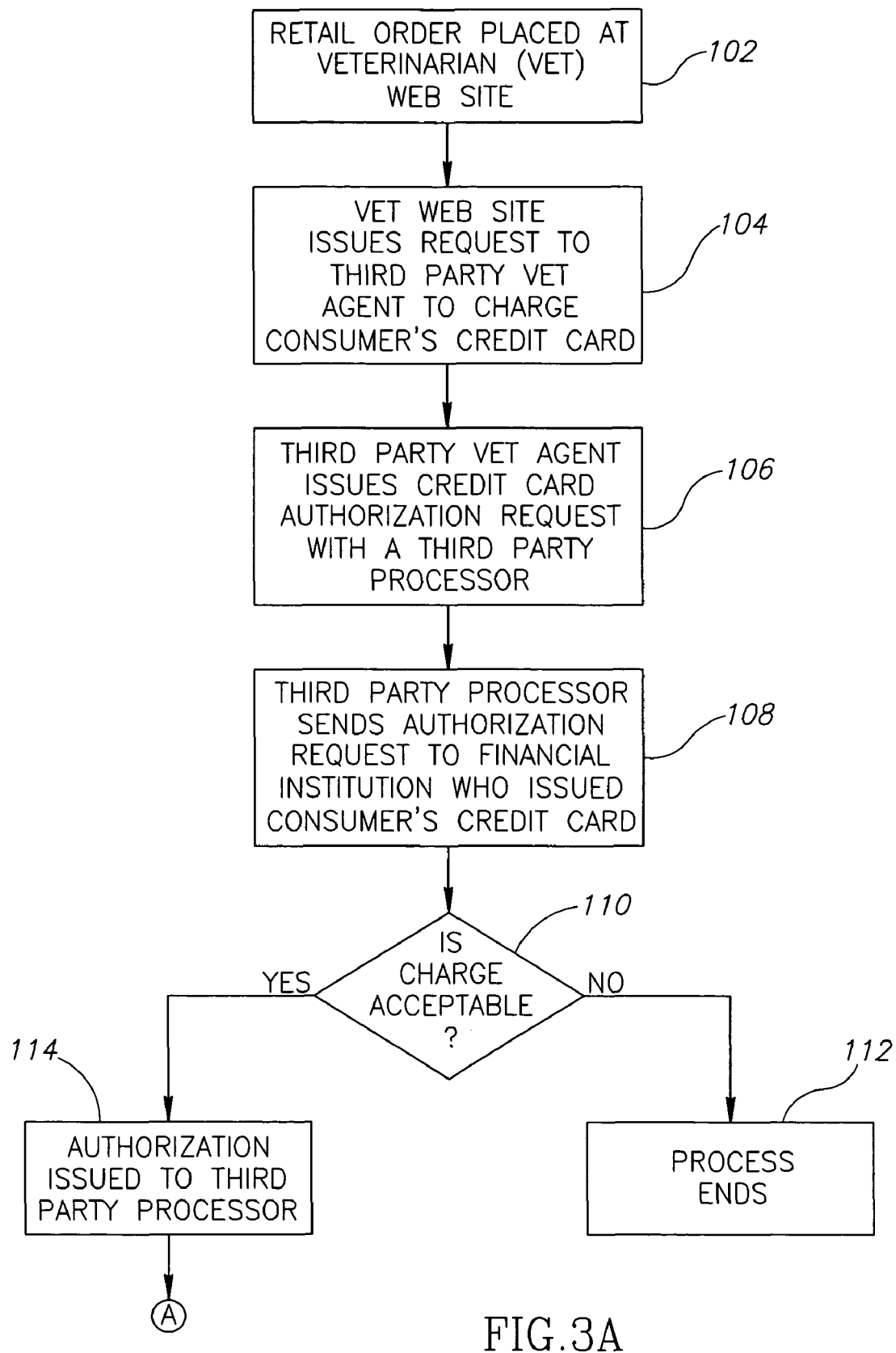
FIGS. 3A-3D are a flow diagram showing a process of order purchasing and fulfillment in accordance with an embodiment of the invention.
Figure 3B:
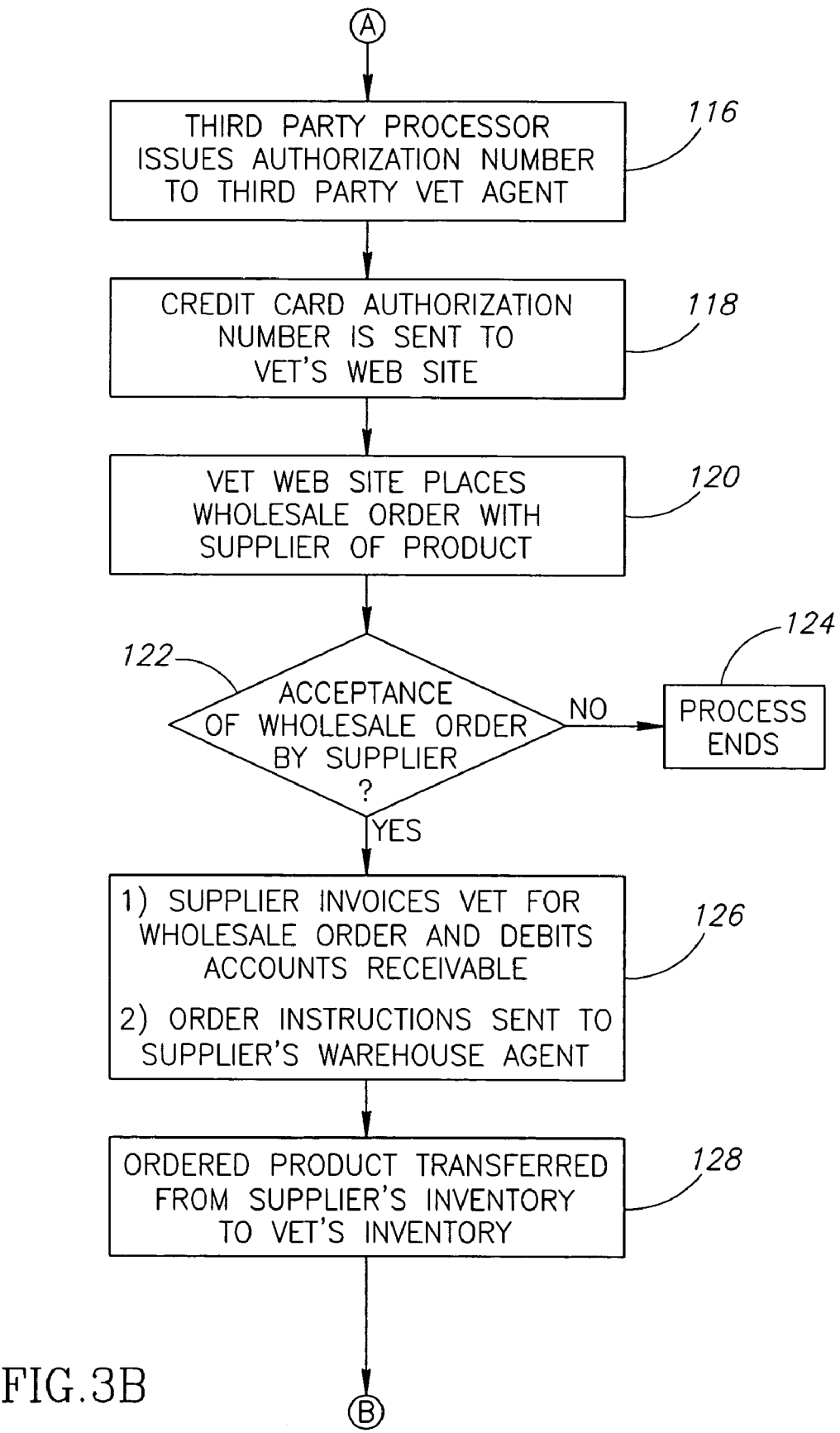
Figure 3C:
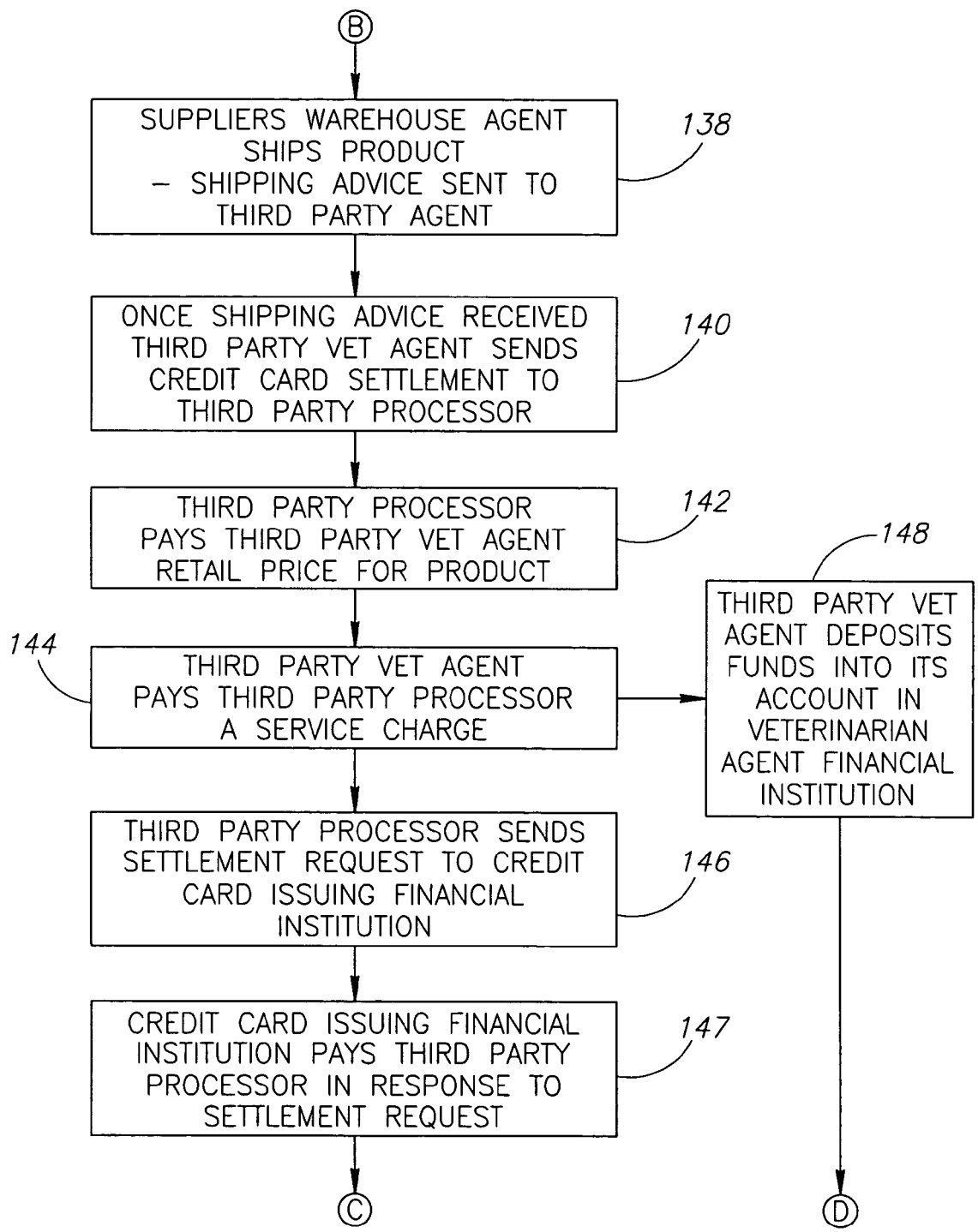
Figure 3D:
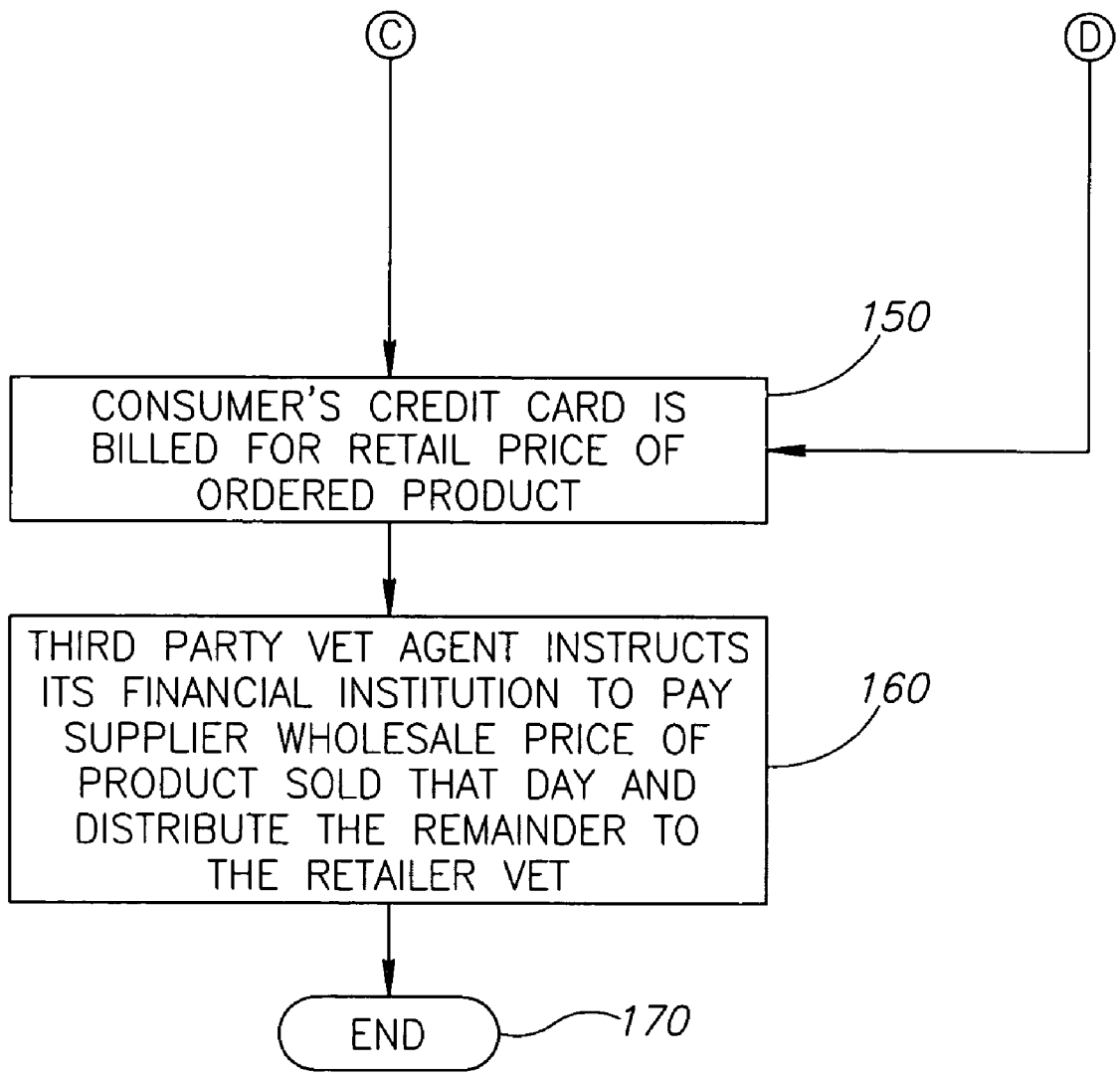

FIG. 2 shows the system 20, and in particular, the components associated with processing and fulfilling the consumer's order. All of the components described below are electronically linked to other components or the network, for example, the Internet 22, by links. These links are wired, wireless, or combinations thereof, and may be single or multiple.

The home server (HS) 24, here, for example, associated with the supplier, is linked to the veterinarian web site (S1) 30a, either directly (in broken lines) or through the Internet 22. The home server (HS) 24 is also linked to a warehouse agent 40, along a private, and preferably secure link. The warehouse agent 40 includes components for billing, shipping and sending shipping advices to the requisite components of the system 20. The home server (HS) 24 is linked to the Internet 22.

A third party veterinarian agent 44, here, for example, associated with the veterinarians' web sites (S1-Sn) 30a-30n, is linked to the Internet 22. This third party veterinarian agent 44 is a financial transaction handler or financial agent, that is typically independent of the enterprises controlling the home server (HS) 24 and the veterinarian or retailer web sites (S1-Sn) 30a-30n. This third party veterinarian agent 44 typically includes components for processing credit cards on behalf of the veterinarian or retailer web sites (S1-Sn) 30a-30n, and components for the financial transactions associated with the credit cards as well as directing payments and settling accounts. The third party veterinarian agent 44 is linked to a financial institution 46 of the individual veterinarian (who owns or controls the web site (S1) 30a). This link is typically a private and secure link. In a normal operation, the third party veterinarian agent 44 is linked to multiple individual veterinarian web sites. The third party veterinarian agent 44 is also set up as a merchant with a third party payment processor 48 that processes electronic credit card payments.

The third party payment processor 48 is linked to the Internet 22. It includes components for authorizing credit cards and directing payments to the requisite recipients. The third party payment processor 48 is linked to financial institution (s) 50, typically over a private and secure link(s).

Turning also to FIGS. 3A-3D, an exemplary process of order placement and fulfillment will now be described. This description will also make reference to components detailed in FIGS. 1 and 2.

The process begins as a retail order is placed at the web site of an individual veterinarian, at block 102. The order is ultimately placed through the web site (S1) 30a of a particular veterinarian, for a particular product(s). The actual order, as discussed above, can be placed on the veterinarian's web site (S1) 30 through a call center agent (CC) 34, who places an order that was attempted through the supplier, the veterinarian or their staff, or by a consumer C2 (retail purchaser) who has accessed the web site (S1) 30a of his veterinarian over the Internet 22. This retail order is input into databases of the homer server (HS) 24. With the input received, the consumer's credit card is now subjected to an authorization process.

At block 104, the veterinarian's web site, for example, web site (S1) 30a, sends a request to the third party veterinarian agent 44 to obtain authorization to charge the consumer's credit card. The third party veterinarian agent 44 then passes this request to a third party credit card processor, such as the third party processor 48, at block 106. The third party veterinarian agent 44 is previously set up as a merchant with the third party processor 48. The third party processor 48 is typically an organization associated with a financial institution.

The third party processor 48 sends an authorization request to the financial institution, for example, the financial institution 50, that issued the credit card to the consumer, at block 108. The financial institution 50 determines if the monetary charge by the consumer for the product is acceptable, at block 110. If the charge is not acceptable, the process ends, at block 112. This end of the process may include a message sent to the veterinarian's web site (S1) 30a (through the third party processor 48 and third party veterinarian agent 44) that the credit card was denied. The veterinarian may inform the consumer of this denial, by electronic mail or other conventional notification method.

If the charge is acceptable, the process moves to block 114, where the credit card issuing financial institution 50 issues an authorization to the third party processor 48, that the monetary charge made by the consumer is acceptable. At block 116, the third party processor 48 issues an authorization number to the third party veterinarian agent 44. This authorization number is, in effect, a guarantee of payment to the third party veterinarian agent 44. The third party veterinarian agent 44 receives the authorization number, and sends a credit card authorization to the veterinarian's web site (S1) 30a, at block 118.

The phase of the process detailed by blocks 104-118, where the consumer's credit card is authorized for the amount of the purchase of product, is transparent to the consumer. With the consumer's credit card authorized for the consumer's retail order of the product, the veterinarian's web site (S1) 30, places a wholesale order, that is similar and typically identical in all aspects, except price, to the consumer's retail order, and the next phase of the process begins.

Specifically, at block 120, the veterinarian web site (S1) 30a places a wholesale order with the supplier of the product. The wholesale order includes the consumer's shipping information. The supplier, through rules and policies at the home server (HS) 24 or other server(s) associated with ordering and shipping, determines whether to accept the wholesale order, at block 122. If the order is not accepted, the process ends at block 124. The activity at block 124 is similar to that described for block 112 above.

If the order is accepted, the process moves to block 126. Within this block, two sub processes occur, typically contemporaneously and may occur simultaneously. In one sub process, the supplier invoices the veterinarian for the wholesale order, by sending an electronic communication to the third party veterinarian agent 44, and the supplier debits its accounts receivable (for example, a database inside the home server (HS) 24 or other device performing financial applications for the supplier). In the other sub process, the supplier sends the order information with shipping instructions to its warehouse agent, for example, the warehouse agent 40.

The warehouse agent 40 receives the order information and shipping instructions, and transfers the ordered product (by the consumer C2) from its inventory, to the individual veterinarian's inventory (from whose web site the product was ordered), at block 128. In making this transfer, title for the product transfers from the supplier to the individual veterinarian. Accordingly, the individual veterinarian owns the product at the time it is delivered to the consumer. The inventory transfer is electronic, in a database or the like, as the veterinarian does not maintain a physical inventory.

The processing of the retail order, in blocks 104-118, and the processing of the corresponding wholesale order, in blocks 120-128, are typically contemporaneous in time.

In the next phase of the process, the product is shipped from the warehouse of the warehouse agent 40 to the consumer. The process now moves to block 130, where the shipment occurs and the warehouse agent 40 electronically sends a shipping advice, over the Internet 22 to the third party veterinarian agent 44, indicating that the order has been shipped. The shipping advice typically includes information as to the carrier used to transport the product to the consumer, departure and estimated arrival times, the carrier name, and the like.

As the third party veterinarian agent 44 is linked to the veterinarian's web site (S1) 30a over the Internet 22, the consumer C2 can access this shipping advice through the veterinarian's web site (S1) 30a, through the web browser of the consumer's (C2) computer 38 over the Internet 22. This phase of the process is also transparent to the consumer C2.

In the next phase of the process, the consumer's credit card is settled and the veterinarian receives the retail price for the product sold to the consumer. The process now moves to block 140, where the third party veterinarian agent 44, upon receiving the shipping advice, sends a credit card settlement request to the third party processor 48, over the Internet 22. At block 142, with the credit card settlement request received, the third party processor 48 orders payment to the third party veterinarian agent 44 for the retail price for the sale of the product. In turn, the third party veterinarian agent 44 orders payment to the third party processor 48 of a service charge, at block 144.

The process moves to blocks 146, 147 and 148 contemporaneously, and the sub processes detailed in blocks 146 and 147, and block 148, can be performed in any order. In block 146, the third party processor 48 sends a settlement request to the credit card issuing financial institution 50. In response to receiving the settlement request, at block 147, the credit card issuing financial institution 50 pays the third party processor the retail price of the product purchased by the consumer, minus an interchange fee.

At block 148, the third party veterinarian agent 44 has received the funds for the retail sale from the third party processor 48. The agent authorizes the deposit of these finds into the third party veterinarian agent's 44 financial institution, for example, the financial institution 46.

From blocks 147 and 148, the process moves to block 150. At this block, the consumer's (for example, the consumer C2) credit card, from which he made the retail purchase of product, is billed. In the credit card invoice, the billing charge line or merchant charge line may include an identity line that is common to the retailer veterinarian and the supplier, but not unique to just one of them.

The final phase of the process involves the supplier receiving the wholesale price from the retailer. With the process having now moved to block 160, the third party veterinarian agent 44 instructs the financial institution 46, through electronic communications, to pay to the supplier the wholesale price of the product sold that day. The remainder of the funds (based on the retail price) goes to the veterinarian (typically, their bank account) from whose web site the retail sale was made. While a daily settlement is indicated, the settlement may be any other predetermined time, such as every other day, weekly or even monthly, depending on the desires of the supplier and the veterinarians. These funds may be transferred in accordance with conventional financial transfer methods.

Additionally, within the normal credit card grace period, the consumer C2, will pay the retail price to the credit card issuing financial institution 50.

The process ends at block 170. The process can be repeated for as long as desired, and for as many retailers who have web sites supported by the home server (HS) 24.

In the system and method described above, where funds are transferred between parties and/or accounts corresponding to parties, transfer of funds is accomplished by conventional funds transferring methods. These methods may include Electronic Funds Transfer (EFT).

While the methods and systems are described above for veterinarians, the methods and systems may be applied to other professionals or specialized retailers, where the consumer has a first consultation with the professional or specialized retailer, prior to purchasing the product recommended by the professional or specialized retailer. The product purchased from the professional or specialized retailer, is shipped directly to the consumer from the supplier, such that the professional or specialized retailer does not maintain a physical inventory of the product. Additionally, the supplier maintains a group of informed consumers for its exclusive products.

2. Method

The present invention also provides a method for fulfilling and managing product orders. The method allows a consumer or buyer, to purchase products from a supplier, that were previously only available to the consumer or buyer through purchase and pick up at approved or licensed retailers. The method allows for a consumer or buyer to purchase the desired product from the supplier, through a supplier-approved retailer approving the purchase. The consumer or buyer receives their product delivered to their desired address, for example, their home, from the supplier. The method involves orders for product that travel through both the retail and wholesale channels. However, the order movement along the retail and wholesale channels is transparent to the consumer or buyer, who places a retail order through a supplier-approved retailer, and receives the desired product from the supplier, delivered to his desired address, with his credit card being charged for the retail price of the order. The method disclosed may, for example, be performed on the system 20 detailed above, and shown in FIGS. 1-3D.

FIGS. 4-9 show the method of the invention, as applied to a specialized product from a supplier, and a supplier authorized and approved veterinarian retailer. The method is illustrated in a series of diagrams. Each diagram is directed to a phase of the method.

Figure 4:
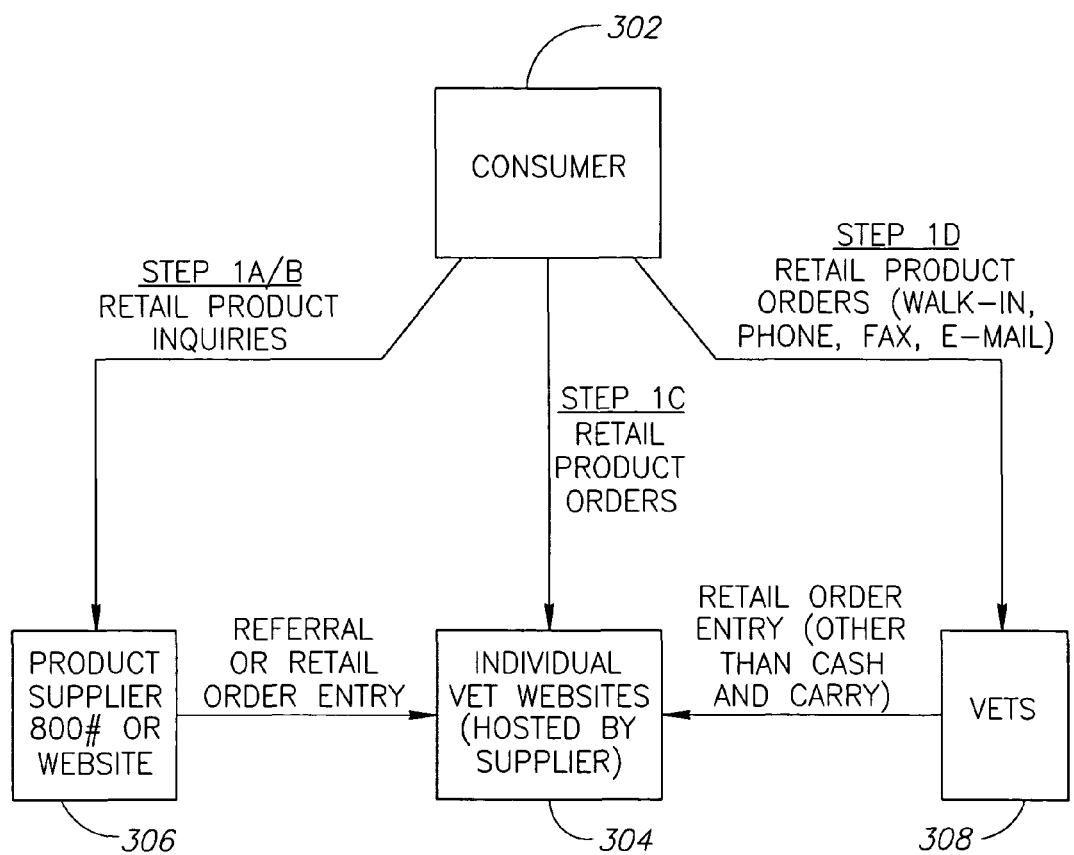
FIGS. 4-9 are diagrams of phases of a method in accordance with an embodiment of the invention.

FIG. 4 shows the first phase of the method. In this phase, a consumer or buyer places a retail order for the product of a supplier through a retailer. The retailer must approve the purchase, as the product may be such that its sale and distribution is highly controlled. The retailer may, for example, be a veterinarian, who is approved and authorized by the supplier to sell the supplier's product, to consumers they have approved. The approval to sell a specific product carried by the supplier to the individual consumer or buyer, may be made through a consultation, between, for example, the veterinarian retailer and the consumer. In this phase, the veterinarian retailer does not maintain any physical inventory of product, but merely serves as an approved ordering point for the consumer to obtain product from the supplier, who maintains all physical inventory of product until the product is shipped to the consumer (or buyer), as detailed below.

The consumer (or buyer) 302 will make a retail product order, that will ultimately be placed through a web site 304 of an individual veterinarian. The individual veterinarian is approved by the supplier to be a retailer for the product. The individual veterinarian web sites 304 are typically hosted by the supplier, and include e-commerce modules that enable consumers 302 to place orders through the web sites. For purposes of explanation, the veterinarian web site 304 is representative of all veterinarian web sites supported by the supplier, and who are authorized by the supplier to be retailers of the supplier's product(s).

Consumer purchasing may occur, for example, through four typical scenarios. The first two scenarios occur as the consumer 302 may contact the supplier 306, either conventionally, over the telephone, such as through a toll-free telephone number (for example, telephone numbers having the digits 800, 866, 877, 888), or electronically, over a network such as the Internet.

In the case of telephonic inquiries, as the supplier 306 does not handle direct sales from individual consumers 302, a supplier representative will assist the consumer 302 in placing their order. The assistance will be such that the consumer 302 is referred to their veterinarian's web site 304, where the representative enters the consumer's order at the veterinarian's web site 304. Alternately, if the consumer 302 does not have a veterinarian, the representative assists the consumer 302 with selecting a veterinarian, and placing their order as detailed above. Additionally, the consumer 302, once directed by the representative to the requisite veterinarian's web site 304, can place their order electronically, by themselves, by following on-screen prompts at the web site 304. As the product's sale and distribution chain is highly controlled, all orders placed at the individual veterinarian's web site 304 are subject to approval by the veterinarian associated with the web site.

In the case of electronic orders, the consumer 302 may access the web site of the supplier 306. As the supplier 306 does not handle direct sales from individual consumers, the inquiring consumer 302 will be prompted on their monitor, to select their particular veterinarian. Prompting is such that veterinarians may be searched by numerous parameters, including name, address, telephone number, and other search parameters. If a veterinarian is selected, the consumer (consumer's browser) will be directed to the veterinarian's web site 304, with the order placement as detailed above.

If the consumer 302 does not have an existing relationship with a veterinarian, or can not find their veterinarian from the web-based search, the search parameters entered may be used to assist the consumer 302 in selecting a veterinarian, with a supplier-approved web site, to place their order. Once the consumer 302 arrives at the chosen veterinarian web site 304, their order may be placed on the web site 304 as detailed above. In this case, the order placed at the veterinarian's web site 304 must be approved by the veterinarian.

In another ordering scenario, consumers 302 may go to their veterinarian's web site 304, and place an electronic order directly at the web site 304 (as detailed above). Ordering in this manner is typically operational at all times.

Another ordering scenario is along more conventional techniques, where the consumer 302, places their order with their veterinarian, through the veterinarian's office 308. The order is typically placed by conventional methods, such as a personal visit (walk-up), telephone, facsimile, electronic mail, or the like, to the veterinarian's office. If the veterinarian has the product on hand, the consumer can purchase the product from the veterinarian's office 308 on a cash and carry basis. As this is typically not the case, or if the consumer would like home delivery of the product, the veterinarian's staff or the like (or the veterinarian), enters the consumer's order on the veterinarian's web site 304, as detailed above.

Figure 5:
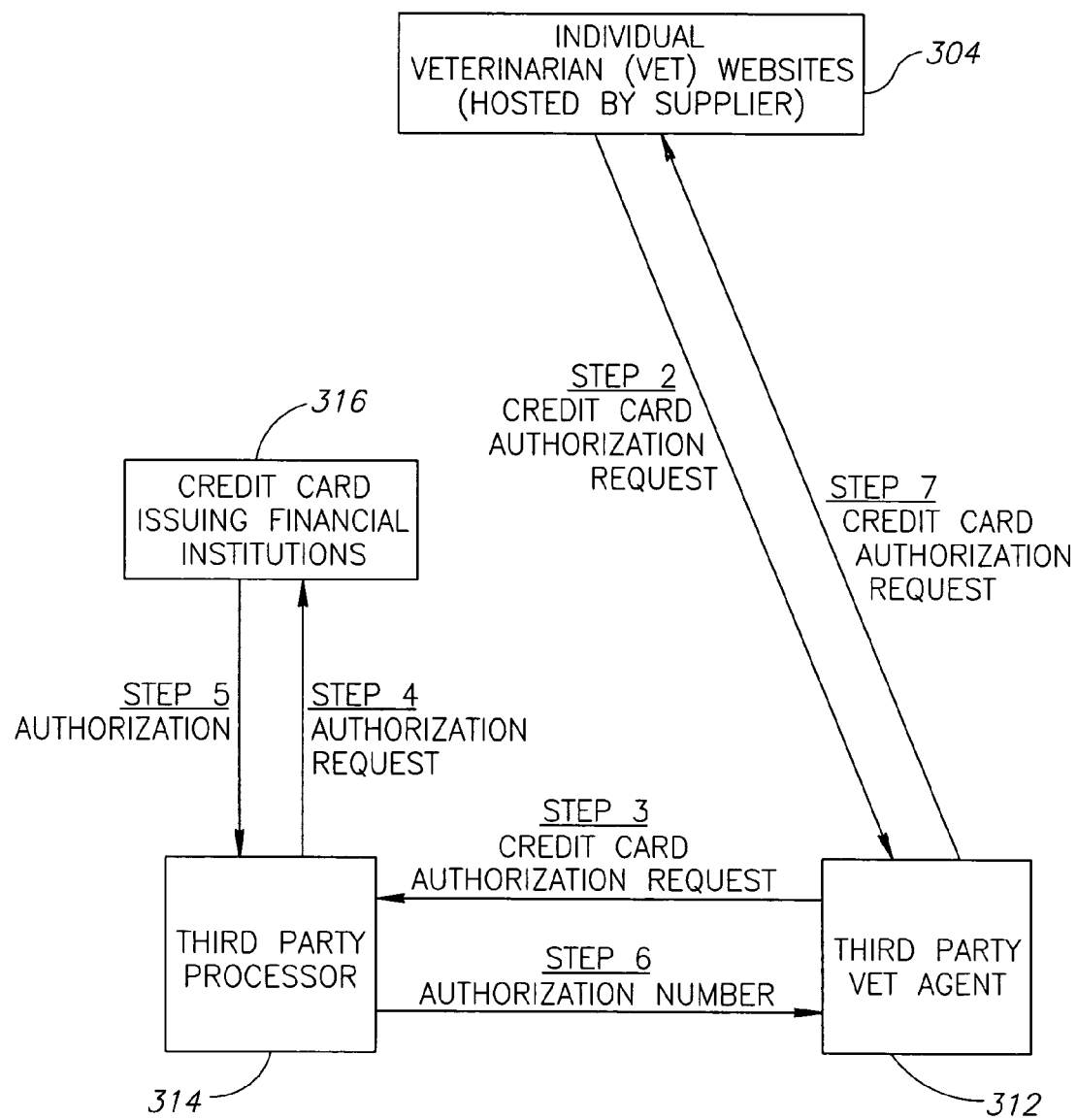

A second phase of the method is now described. This second phase begins as retail product orders are received at the veterinarian's web site 304. From the web site 304, a retail order and a parallel wholesale order are made. FIG. 5 illustrates the retail channel for the order, as the consumer's credit card is authorized for the consumer's retail purchase of the product.

The veterinarian web site 304 places a credit card authorization request with a third party veterinarian agent 312. This request is such that the third party veterinarian agent 312 obtains authorization to charge the consumer's credit card for the retail price of the product ordered. The third party veterinarian agent 312 is a financial agent, typically independent of the enterprises controlling the ordering of the product. The third party veterinarian agent typically handles credit card processing for all veterinarians, whose web sites are associated both with it and the supplier. Additionally, the third party veterinarian agent 312 is typically set up as a merchant for credit card transactions.

The third party veterinarian agent 312, having received a credit card authorization request, will send a similar credit card authorization request to a third party processor (for credit cards) 314. This third party processor 314 may be a service provider, for example, Paymentech® electronic payment processing. The third party processor 314 then sends an authorization request to the financial institution 316, that issued the consumer's credit card, that is being used for this retail purchase.

The credit card issuing financial institution 316 determines if the charge in the authorization request is acceptable. If it is not, the method terminates, and the consumer 302 is notified that the attempted charge is not acceptable. If the charge is acceptable, an authorization is issued to the third party processor 314. The third party processor 314 issues and sends an authorization number for this retail transaction (sale) to the third party veterinarian agent 312. This authorization number typically serves as a payment guarantee for the third party veterinarian agent 312. With the authorization number received from the third party processor 314, the third party veterinarian agent 312 sends an authorization to the veterinarian's web site 304.

Figure 6:
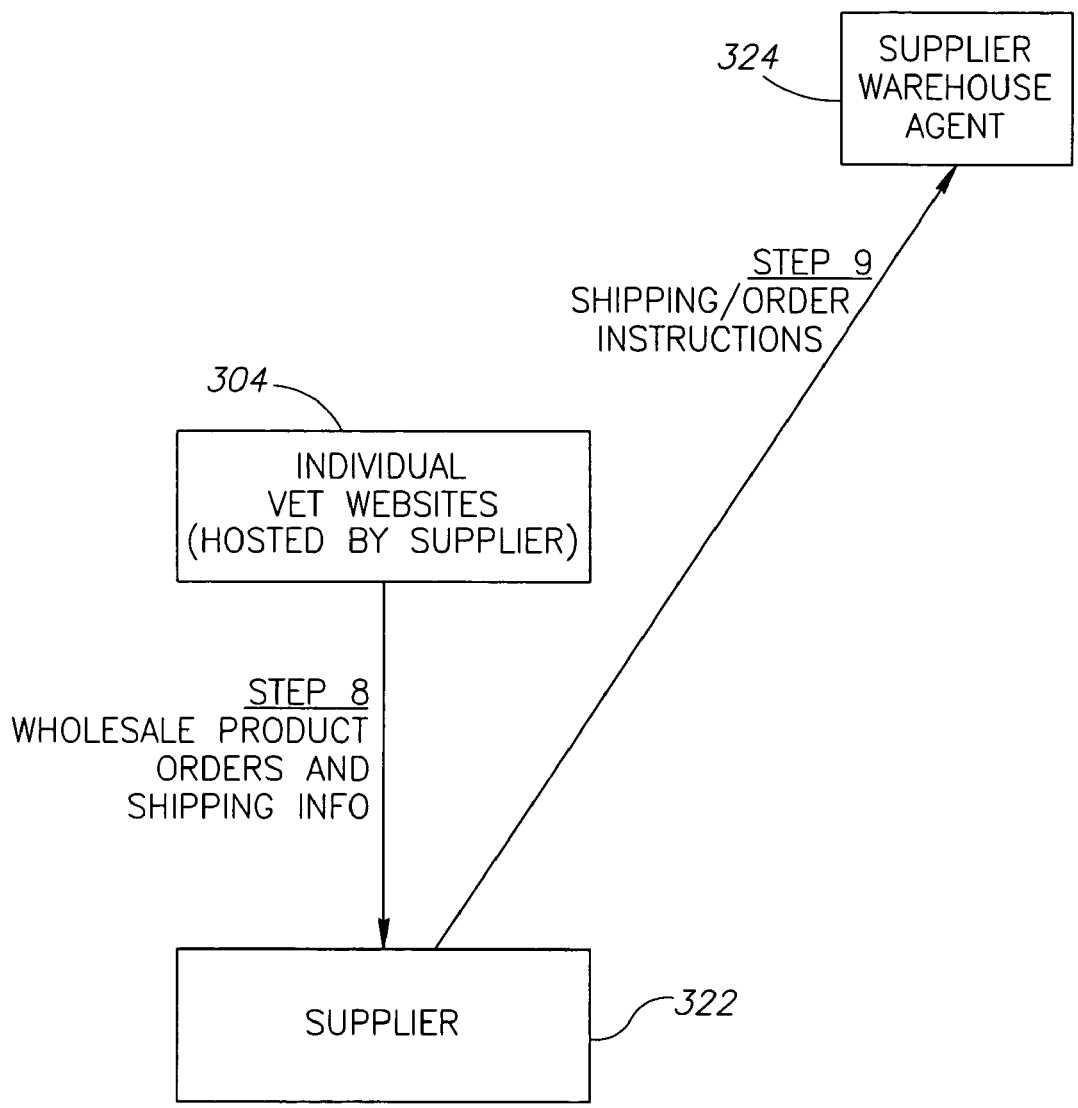

The next phase of the method begins, as shown in FIG. 6, where the veterinarian places the wholesale order for the product with the supplier. The wholesale order is over a separate channel, between the veterinarian web site 304 and the supplier 322 of the product, for which the order has been placed.

Initially, once the veterinarian web site 304 has received an approved credit card authorization, from the third party veterinarian agent 312, the consumer's order is considered to be accepted (along with any other rules and policies of the particular veterinarian who controls the web site necessary to authorize a retail sale to the particular consumer). With this acceptance, the veterinarian web site 304 places a wholesale order for the product with the supplier 322. This wholesale order typically includes the shipping information for the consumer 302 who made the order.

The supplier 322, if the wholesale order is accepted, invoices the individual veterinarian (from whose web site they received the wholesale order), for the wholesale order and debits their accounts receivable. The supplier 322 also sends the order information with shipping instructions to its warehouse agent 324. Upon receiving the order, the warehouse agent 324 transfers the ordered product from its inventory to the ordering veterinarian's inventory, and therefore, transferring the title for the ordered product from the supplier 324 to the veterinarian (from whose web site the sale was made).

Figure 7:
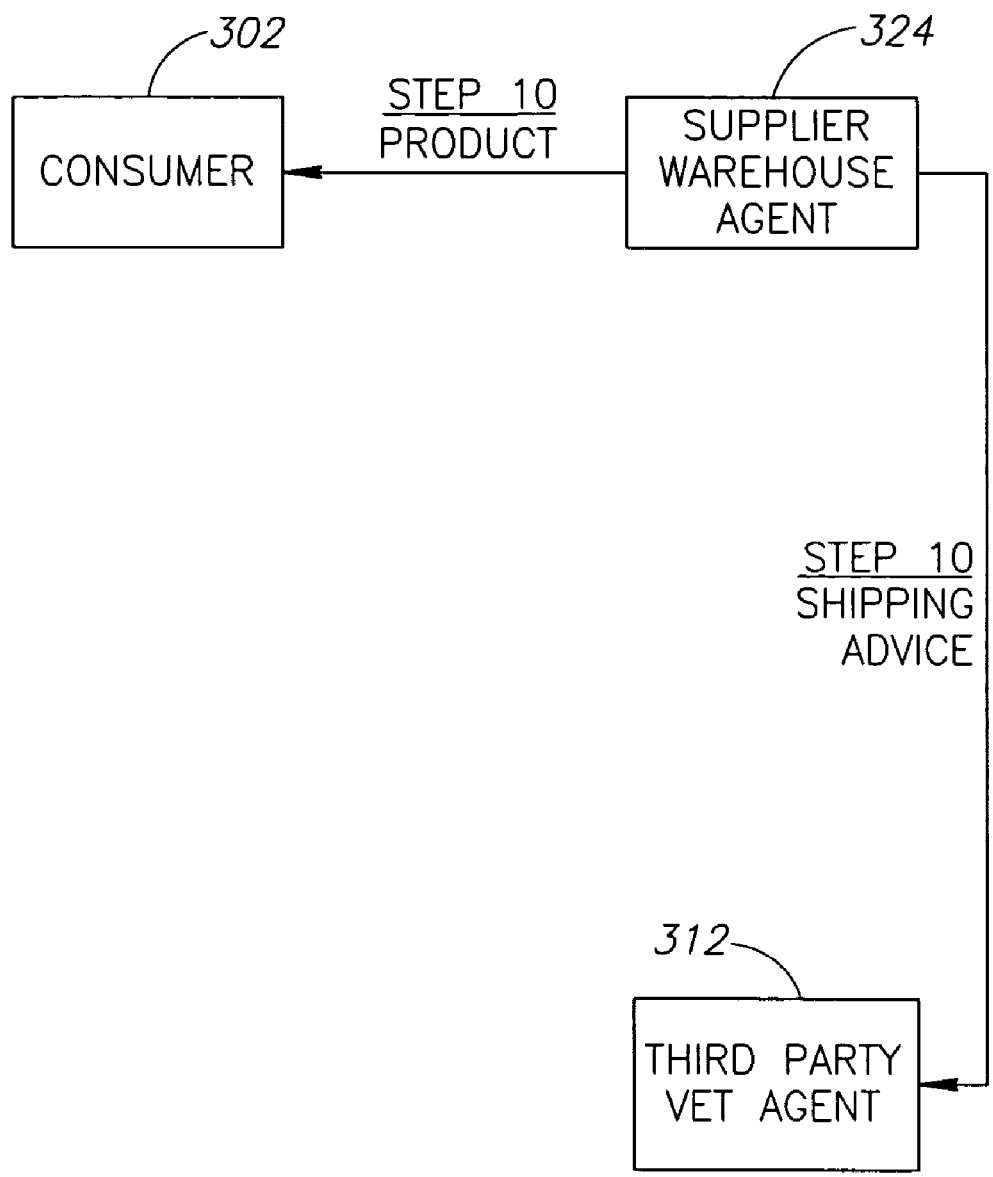

FIG. 7 shows the next phase of the method, where the supplier ships the ordered product to the consumer for the veterinarian. The warehouse agent 324 now ships the ordered product to the consumer (buyer) 302. Typically contemporaneous with the shipping, the warehouse agent 324 sends a shipping advice to the third party veterinarian agent 312. This shipping advice indicates that the order of product has been shipped, the carrier, estimated departure time and estimated arrival (delivery) time. The information from this shipping advice is accessible by all parties, through the veterinarian's (from whom the sale was made) web site 304.

Figure 8:
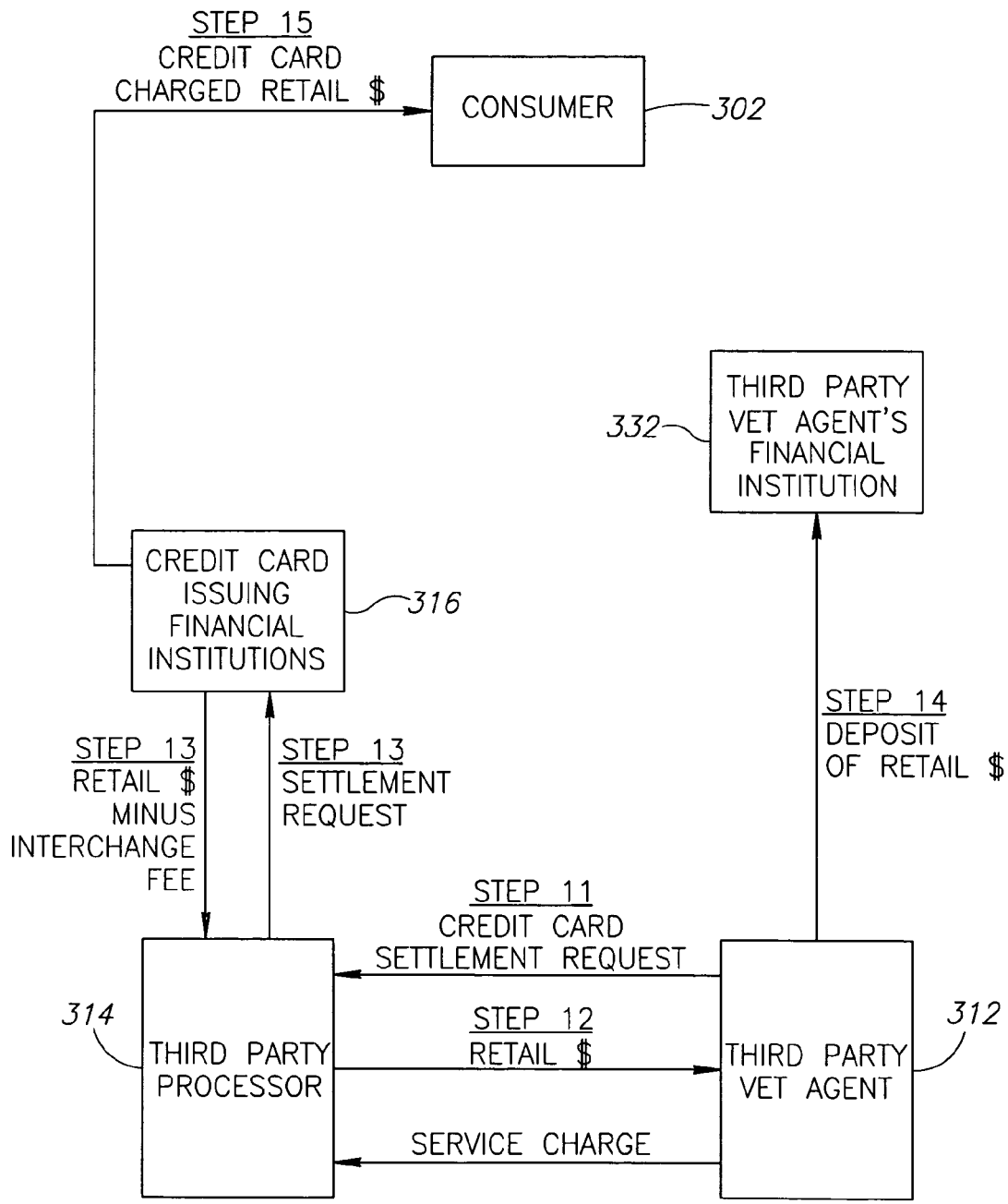

The consumer's credit card is settled and the veterinarian receives the retail price for the sale in the next phase of the method, as shown in FIG. 8. The third party veterinarian agent 312, upon receiving the shipping advice, sends a credit card settlement request to the third party processor 314. The third party processor 314, upon receipt of the credit card settlement request, pays the third party veterinarian agent 312 the price for the retail sale. The third party veterinarian agent 312 pays the third party processor 314, a merchant service charge, for the transaction.

The third party processor 314 then sends a settlement request to the credit card issuing financial institution 316 of the consumer's credit card used in making the order. The credit card issuing financial institution 316 typically pays the third party processor 314 the retail price, minus an interchange fee.

The third party veterinarian agent 312, having received payment from the third party processor 314, deposits the funds received as the payment into its account at a financial institution 332. The credit card issuing financial institution 316 bills the credit card of the consumer 302, for the retail price of the order, with the billing charge line or merchant charge line, that may include an identity line common to the retailer veterinarian and the supplier, but not unique to just one of them.

Figure 9:
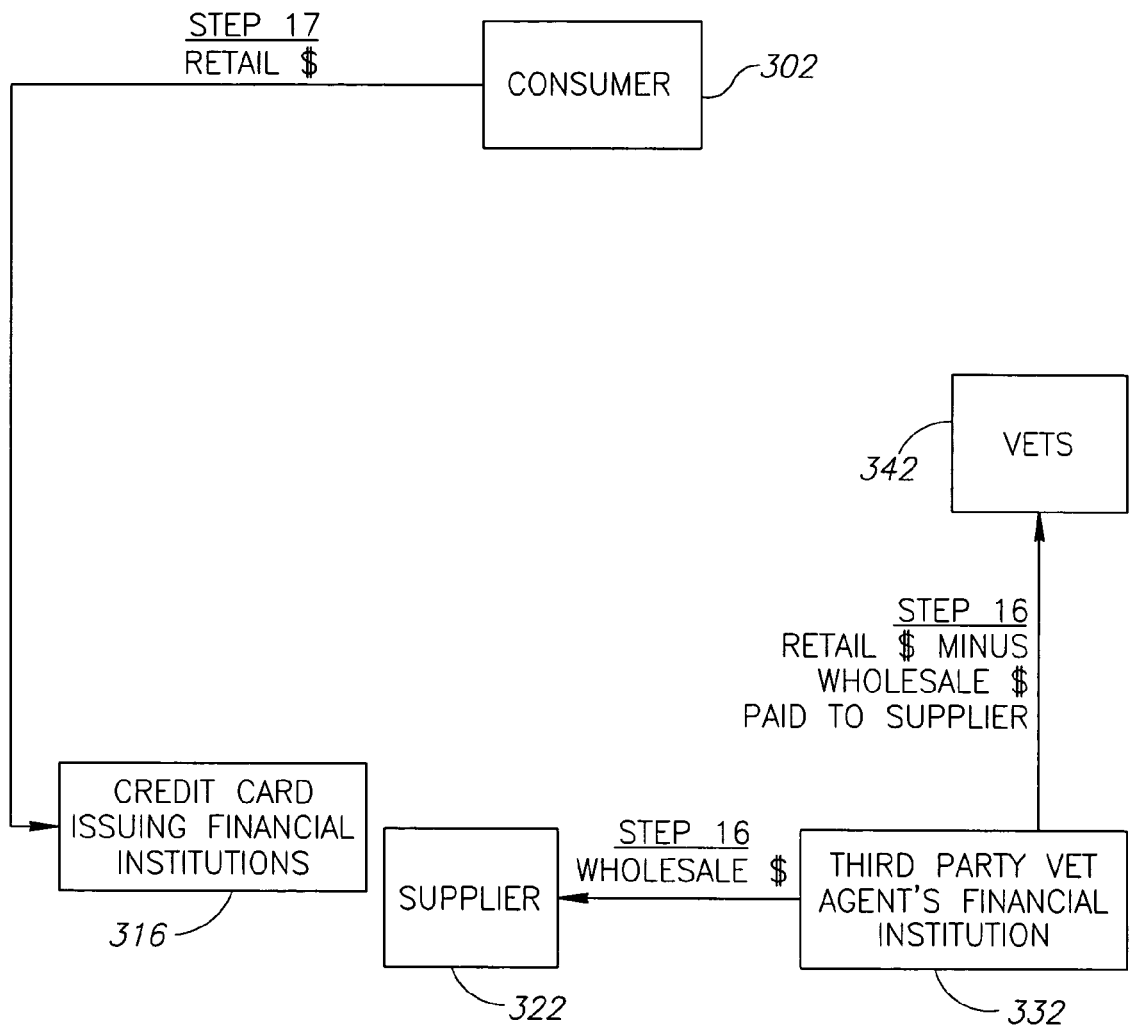

In the final phase, as shown in FIG. 9, the wholesale price is paid to the supplier. The veterinarian, from whose web site the sale was made, retains the remainder of the funds. At a predetermined time, typically a nightly basis, the veterinarian agent's financial institution 332, upon receiving an instruction (typically electronic) from the third party veterinarian agent 312, will pay the supplier 322 the wholesale price of product sold by the veterinarian that day. The remainder of the price will be distributed to the veterinarian 342 (associated with the web site 304 from which the sale was made).

Additionally, the consumer 302 will pay the requisite funds for the credit card charge for the order, to the credit card issuing financial institution 316. This payment is made within the normal grace period for the credit card, as per the credit card agreement between the consumer 302 and the credit card issuing financial institution 316.

In the method described above, where funds are transferred between parties and/or accounts corresponding to parties, transfer of funds is accomplished by conventional funds transferring methods. These methods may include Electronic Funds Transfer (EFT).

The above described systems, methods and processes, including portions thereof, sub processes, etc., can be performed by software, hardware and combinations thereof. The methods and process, and portions thereof, can be performed by computers, computer-type devices, workstations, processors, microprocessors, other electronic searching tools and memory and other storage-type devices associated therewith. The process and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

The systems, methods and processes, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The systems, methods and processes have been described in a manner sufficient to enable persons of ordinary skill in the art to readily adapt other hardware and software as may be needed to reduce any of the embodiments to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A computer-implemented method for managing an order for a regulated product electronically placed with a veterinarian, the computer-implemented method comprising: providing an interface associated with the veterinarian to receive at least one order for the regulated product, wherein the interface is provided by a supplier for the veterinarian; receiving electronic input corresponding to an order for the regulated product via the interface, wherein the electronic input comprises shipping information associated with a customer; determining, via a processor, whether the customer is authorized by the veterinarian to possess the regulated product and whether the veterinarian is authorized by the supplier to sell the regulated product; placing a first order with a financial agent for a distribution of funds from the customer to the veterinarian when the customer is authorized by the veterinarian to possess the regulated product and that the veterinarian is authorized by the supplier to sell the regulated product, wherein the first order is based on the order for the regulated product received via the interface; and placing a second order with the supplier for a distribution of the regulated product to the customer using the interface when the customer is authorized by the veterinarian to possess the regulated product and that the veterinarian is authorized by the supplier to sell the regulated product, wherein the second order is based on the order for the regulated product received via the interface, and wherein title of the regulated product is transferred from the supplier to the veterinarian when the second order is placed, such that the veterinarian has title of product when the regulated product is distributed to the customer associated with the shipping information by the supplier.

2. The computer-implemented method of claim 1, wherein the first order includes a retail order and the second order includes a wholesale order.

3. The computer-implemented method of claim 2, wherein the retail order and the wholesale order are placed contemporaneous in time with respect to each other.

4. The computer-implemented method of claim 1, wherein the electronic input corresponding to the order includes a name of a buyer associated with the at least one order.

5. The computer-implemented method of claim 4, wherein the interface comprises at least one of the following: a web page, a telephone interface, and an electronic document.

* * * * *